United States Patent [19]

Birch et al.

[11] Patent Number: 4,460,242

[45] Date of Patent: Jul. 17, 1984

[54] OPTICAL SLIP RING

[75] Inventors: Ernest H. Birch; Andres Lobato, both of Reading, England

[73] Assignee: I.D.M. Electronics Limited, Reading, England

[21] Appl. No.: 381,710

[22] Filed: May 25, 1982

[51] Int. Cl.³ .............................. G02B 5/14; G02B 5/16
[52] U.S. Cl. .................. 350/96.20; 350/96.21; 350/96.22; 250/551; 250/227
[58] Field of Search ............... 350/96.20, 96.21, 96.22, 350/96.24; 250/551, 227

[56] References Cited

U.S. PATENT DOCUMENTS

| | | | |
|---|---|---|---|
| 4,022,647 | 5/1977 | Yevick | 350/96.24 |
| 4,027,945 | 6/1977 | Iverson | 350/96.22 |
| 4,190,318 | 2/1980 | Upton, Jr. | 350/96.2 |
| 4,278,323 | 6/1981 | Waldman | 350/96.2 |
| 4,389,645 | 6/1983 | Wharton | 350/96.2 |
| 4,401,360 | 8/1983 | Streckmann et al. | 350/96.2 |

Primary Examiner—David K. Moore
Assistant Examiner—Brian Healy
Attorney, Agent, or Firm—Robert D. Yeager

[57] ABSTRACT

An optical slip ring comprises a rotatable output member and a second rotatable member located intermediate the output member and a stationary input member, the input member having a plurality of equispaced light inputs and the output member having a corresponding number of light outputs and the second rotatable member having a coherent strip formed of a plurality of bundles of optical fibres for transmitting light from the light inputs on the input member to the light outputs, on the output member, the arrangement being such that a continuous light output is produced from the light outputs on the output member only when the intermediate rotatable member is rotated at half the speed of the output member.

3 Claims, 3 Drawing Figures

OPTICAL SLIP RING

DESCRIPTION

This invention relates to electrical slip rings.

An object of the invention is to provide an optical slip ring employing optical fibres to allow light signals applied to any one or all of a number of inputs to be reproduced at a corresponding number of outputs of the slip ring in a continuous manner.

Thus, according to the invention there is provided an optical slip ring comprising a rotatable output member and a second rotatable member located intermediate the rotatable output member and a stationary input member, said input member having a plurality of spaced light inputs, said output member having a corresponding number of correspondingly spaced light outputs and said intermediate member having a plurality of bundles of optical fibres for transmitting light from the light inputs on the input member to the light outputs on the output member, the relative positions of the input and output ends of each bundle of fibres being such that during rotation of the output and intermediate members, a continuous output is produced from an output member in response to light applied to a corresponding input of the stationary member only when the intermediate member is rotated at half the speed of the output member.

In an embodiment of the invention the member carrying the bundles of optical fibres is located intermediate an inner output member and an outer input member, each input being supplied to the outer member via a single optical fibre, the light input passing through at least one optical fibre bundle on the intermediate member to an output on the inner output member provided the intermediate member is rotated at half the speed of rotation of the inner output member.

The invention will now be described by way of example only with particular reference to the accompanying drawings wherein.

Figure 1:
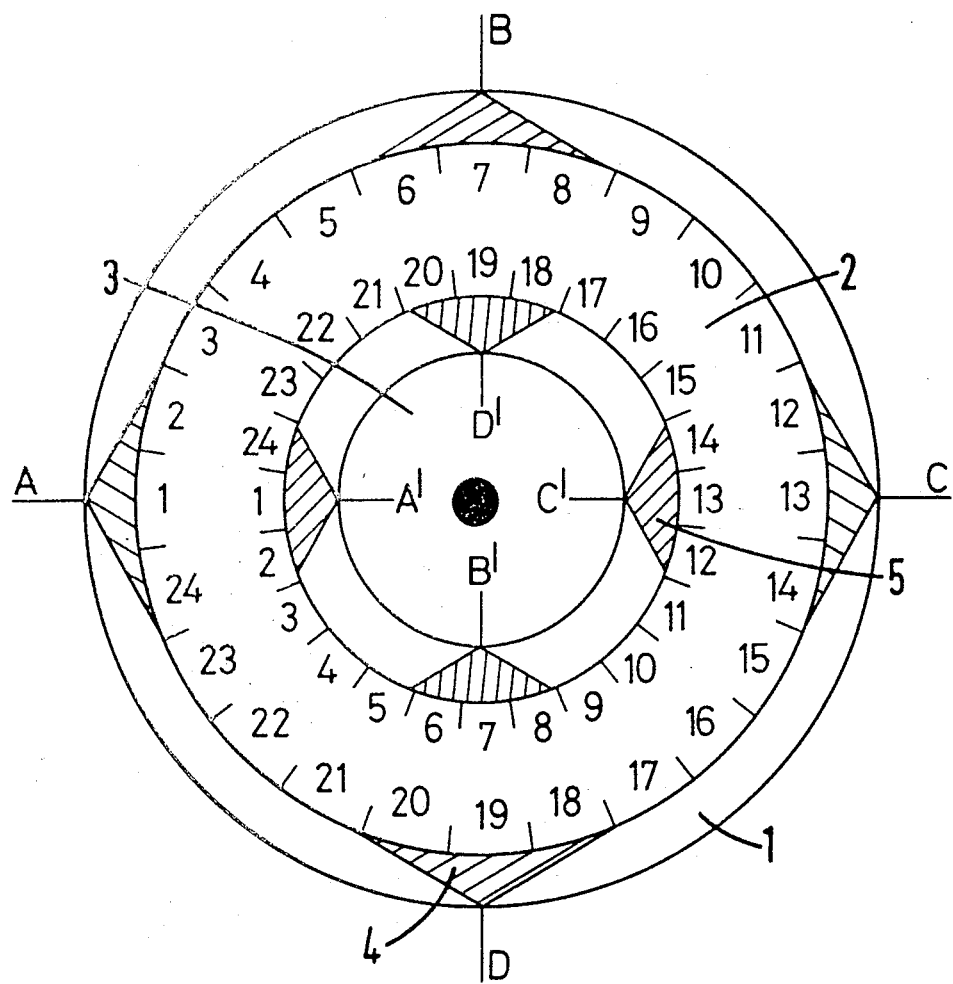
FIG. 1 is a diagrammatic representation of the relationship between the bundles of optical fibres and the inputs and outputs of the slip ring of the invention.

Referring to FIG. 1, the slip ring comprises an outer stationary member 1 having four equispaced inputs each comprising a single optical fibre A, B, C, D, through which light passes to a coherent strip formed on an intermediate rotatable member 2. The strip is formed of a plurality of bundles of optical fibres, twenty four being shown by way of illustration and the input ends of the bundles 1 to 24 are shown around the outer peripheral edge of the intermediate member 2 and the output ends of the bundles 1 to 24 are shown adjacent the peripheral edge of an inner output member 3 provided with four equispaced outputs designated A', D', C', B'. The divergence of the light applied to the inputs A, B, C, D, is shown at 4 and the convergence of the light passing from the output ends of the bundles of fibres is shown at 5.

It will be assumed for purposes of illustration that the starting position for operation of the slip ring is as shown in FIG. 1 with the input ends of bundles 1, 2, 24, on intermediate member 2 aligned with fibre A on stationary member 1 and the corresponding output ends of bundles 1, 2, 24 being aligned with output A' on inner output member 3.

Similar alignment occurs between fibre B and output B' via input and output ends of bundles 6, 7, 8; between fibre C and output C' via input and output ends of bundles 12, 13, 14, and between fibre D and output D' via the input and output ends of bundles 18, 19, 20. It will be seen that light supplied to the single optical input fibre D diverges through optical fibre bundles 18, 19, 20 and at the output ends of the bundles 18, 19, 20 converges to appear at output D' on the inner output member 3. Similarly, light supplied to inputs A, B and C will be transmitted through the respective optical fibre bundles 24, 1, 2; 6, 7, 8; and 12, 13, 14; to outputs A', B', C' respectively.

Rotation of intermediate member 2 at half the speed of rotation of the inner output member 3, by differential means (not shown) will retain the relationship between the inputs, optical fibre bundles and outputs but any deviation from this speed relationship will interrupt the transmission of light from the inputs via the optical fibre bundles to the outputs. Thus, only with the speed relationship referred to is a continuous output produced by the inner output member 3.

Figure 2:
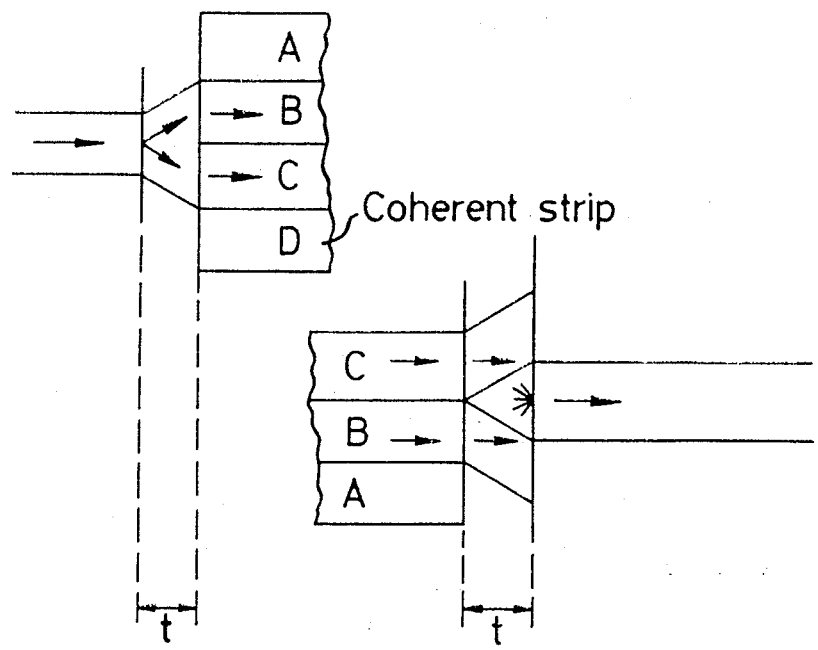
FIG. 2 is a diagram illustrating how a light input is guided through bundles of fibres to an output of the slip ring and FIG. 3 illustrates how the spread of the light passed through an optical fibre is dependent on the dimensional characteristics of the fibre.

FIG. 2 illustrates how light from a single optical fibre diverges to pass through a plurality of bundles B, C, of the coherent strip and converges at the output ends of the fibre bundles to pass through the single output fibre.

Figure 3:
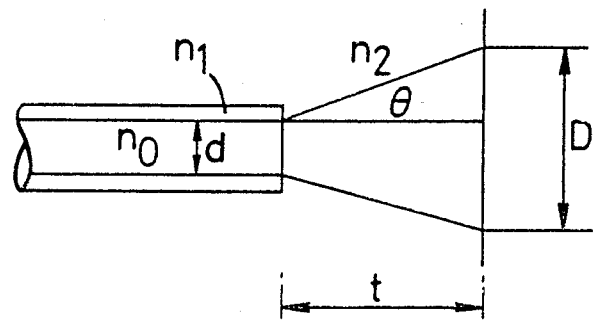

FIG. 3 illustrates how the degree of divergence of the light depends on the dimensions of the optical fibre through which the light is passing, the diameter D of the divergent beam being represented as $$D = d + 2t \tan \theta$$

where $\eta_2 \sin \theta = (\eta_o^2 - \eta_1^2)^{\frac{1}{2}}$ where $\eta_o$ is the internal diameter of the fibre, $\eta_1$ is the thickness of the fibre wall, t is the distance from the output end of the fibre to the measured point of divergence, $\theta$ is the angle of divergence and D is the diameter of the divergent beam.

Although in FIG. 1, the divergent beam of light is shown as passing through three bundles of fibres, in practice the area covered by a single fibre and the size of the coherent bundle would be far smaller but the ratio of area to bundle size would be similar to that illustrated.

The light for the input fibres on the stationary member may be derived from photodiodes and similarly the light reproduced at the outputs on the inner member may irradiate photodiodes.

I claim:

1. An optical slip ring comprising a rotatable output member and a second rotatable member located intermediate the rotatable output member and a stationary input member, said input member having a plurality of spaced light inputs, said output member having a corresponding number of correspondingly spaced light outputs and said intermediate member having a plurality of bundles of optical fibres for transmitting light from the light inputs on the input member to the light outputs on the output member, the relative positions of the input and output ends of each bundle of fibres being such that during rotation of the output and intermediate members, a continuous output is produced from an output member in response to light applied to a corresponding input of the stationary member only when the intermediate member is rotated at half the speed of the output member.

2. An optical slip ring as claimed in claim 1 wherein said plurality of spaced light inputs each comprise a single optical fibre through which light is arranged to pass to a coherent strip formed on the second rotatable member, said strip being formed of said plurality of bundles of optical fibres with the input ends of the bundles located around the outer peripheral edge of the second rotatable member and the output ends of the bundles located adjacent the peripheral edge of the rotatable output member.

3. An optical slip ring as claimed in claim 1 or 2 wherein light from the light inputs on the input member follows a divergent path through a selected member of said plurality of bundles of optical fibres on the second rotatable member and follows a convergent path from the output ends of the selected number of bundles of fibres to a single output on the rotatable output member.

* * * * *